United States Patent Office 2,763,670
Patented Sept. 18, 1956

2,763,670

PREPARATION OF 17α-METHYL-ANDROSTANE-17β-OL-3-ONE

Franz Sondheimer and George Rosenkranz, Mexico City, Mexico, assignors to Syntex S. A., Mexico City, Mexico, a corporation of Mexico No Drawing. Application March 1, 1955,
Serial No. 491,522

Claims priority, application Mexico March 4, 1954

2 Claims. (Cl. 260—397.4)

The present invention relates to a novel method for the preparation of cyclopentanophenanthrene derivatives.

More particularly, the present invention relates to a novel method for producing the androgenic hormone 17α-methyl-androstane-17β-ol-3-one (methyl-dihydrotestosterone). The compound produced in good yield in accordance with the process of the present invention is an especially important hormone in that it possesses to a large extent the anabolic activity of testosterone while possessing only to a limited extent the androgenic activity thereof. The compound prepared in accordance with the present invention therefore has the same valuable characteristics as androstan-17β-ol-3-one which was found to be a useful compound in the treatment of breast cancer.

In accordance with the present invention there has been discovered a process for the production of methyl-dihydrotestosterone which involves reduction of the known compound methyl-testosterone with an alkali metal in liquid ammonia. It has further been discovered in accordance with the present invention that the use of an alkali metal in liquid ammonia has the advantage of giving preferentially the desired 17α-methyl-androstane-17β-ol-3-one compound having the desired allo configuration, whereas most of the known methods for this type of reduction produced a high percentage of compounds with the normal configuration.

The process of the present invention may be exemplified by the following reaction:

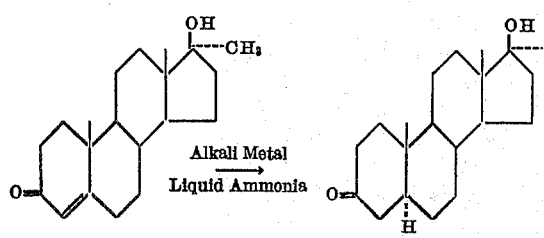

In practicing the process above set forth, the methyl-testosterone in a suitable inert organic solvent such as tetrahydrofurane is added dropwise to a mechanically stirred solution of an alkali metal, preferably lithium, in liquid ammonia. The stirring is continued for a substantial period of time after the addition, for example of the order of twenty minutes, and thereafter the excess of lithium is decomposed as with the addition of t-butyl alcohol. The ammonia is evaporated and the residue is collected with water, and purified as with extraction with chloroform and chromatography to give 17-methyl-androstane-17β-ol-3-one. There is also prepared in accordance with the process 17α-methyl-androstane-3β, 17β-diol, i. e. the corresponding 3-alcohol of the desired product and this by-product can be easily converted into the desired 17-methyl-androstane-17β-ol-3-one by conventional chromic acid oxidation.

The following specific example serves to illustrate but is not intended to limit the present invention:

Example

A solution of 4 g. of methyl-testosterone in 60 cc. of anhydrous tetrahydrofurane was added dropwise to a mechanically stirred solution of 1 g. of lithium metal in 400 cc. of liquid ammonia. The stirring was continued for twenty minutes after the end of the addition and then 25 cc. of t-butyl alcohol was added to decompose the excess of lithium. The ammonia was evaporated and the residue was collected with water, extracted with chloroform and the chloroform solution was washed with dilute hydrochloric acid, sodium carbonate and water, dried over sodium sulfate and evaporated to dryness. The residue was chromatographed in a column with 150 g. of washed alumina and the fractions eluted with benzene-ether were combined and crystallized from acetone to yield 0.83 g. of the desired 17α-methyl-androstan-17β-ol-3-one with a melting point of 190°–191° C., $[\alpha]_D$ 8°. The fractions eluted with ether upon recrystallization from acetone afforded 2.0 g. of 17α-methyl-androstane-3β, 17β-diol with a melting point of 206°–209° C., which was easily converted into the desired 17-methyl-androstan-17β-ol-3-one by conventional chromic acid oxidation.

We claim:

1. A method for the preparation of 17α-methyl-androstane-17β-ol-3-one which comprises reducing 17α-methyl-testosterone with an alkali metal in liquid ammonia.

2. The method of claim 1 wherein the alkali metal is lithium.

References Cited in the file of this patent

UNITED STATES PATENTS 2,702,290    Sondheimer _ _ _ _ _ _ _ _ _ _ _ _ Feb. 15, 1955